(12) United States Patent
Kees

(10) Patent No.: US 8,066,028 B2
(45) Date of Patent: Nov. 29, 2011

(54) STRUCTURE FOR MOUNTING VALVE UNITS ON A VALVE SUPPORT

(75) Inventor: Ulrich Kees, Homburg (DE)

(73) Assignee: Festo AG & Co. KG, Esslingen (DE)

( * ) Notice: Subject to any disclaimer, the term of this patent is extended or adjusted under 35 U.S.C. 154(b) by 347 days.

(21) Appl. No.: 12/311,201

(22) PCT Filed: Dec. 7, 2007

(86) PCT No.: PCT/EP2007/010681
§ 371 (c)(1),
(2), (4) Date: Mar. 20, 2009

(87) PCT Pub. No.: WO2008/086848
PCT Pub. Date: Jul. 24, 2008

(65) Prior Publication Data
US 2009/0242040 A1    Oct. 1, 2009

(30) Foreign Application Priority Data
Jan. 18, 2007    (DE) .......................... 10 2007 002 706

(51) Int. Cl.
*F16K 11/00*    (2006.01)
(52) U.S. Cl. .................... 137/315.09; 137/884; 251/367

(58) Field of Classification Search ............. 137/315.09, 137/315.03, 884; 251/366, 367; 24/456
See application file for complete search history.

(56) References Cited

U.S. PATENT DOCUMENTS

| 4,524,807 | A | * | 6/1985 | Toliusis ......................... 137/884 |
| 5,333,647 | A | * | 8/1994 | Fukano et al. ................. 137/884 |
| 6,874,756 | B2 | * | 4/2005 | Hawkins et al. .............. 251/367 |

FOREIGN PATENT DOCUMENTS

| DE | 1211453 | 2/1966 |
| DE | 3447263 | 6/1986 |
| EP | 0493972 | 2/1997 |
| EP | 0928960 | 7/1999 |
| JP | 2005164021 | 6/2005 |

* cited by examiner

*Primary Examiner* — Kevin Lee
(74) *Attorney, Agent, or Firm* — Hoffmann & Baron, LLP

(57) ABSTRACT

A valve arrangement has a valve unit (3) fixed in position via two mutually spaced attachment structures (27 and 28) on a mounting face (6) of a valve support (2). The first attachment structure (27) includes two mutually engaged hook sections (32 and 33). The second attachment structure (28) includes a U-like retaining clip (58), which is so able to be attached to the structural unit comprising the valve unit (58) and the valve support (2) that its clamping limbs (63 and 64) act on clip sections (54 and 55) and accordingly braces the valve unit (3) onto the valve support (2).

30 Claims, 7 Drawing Sheets

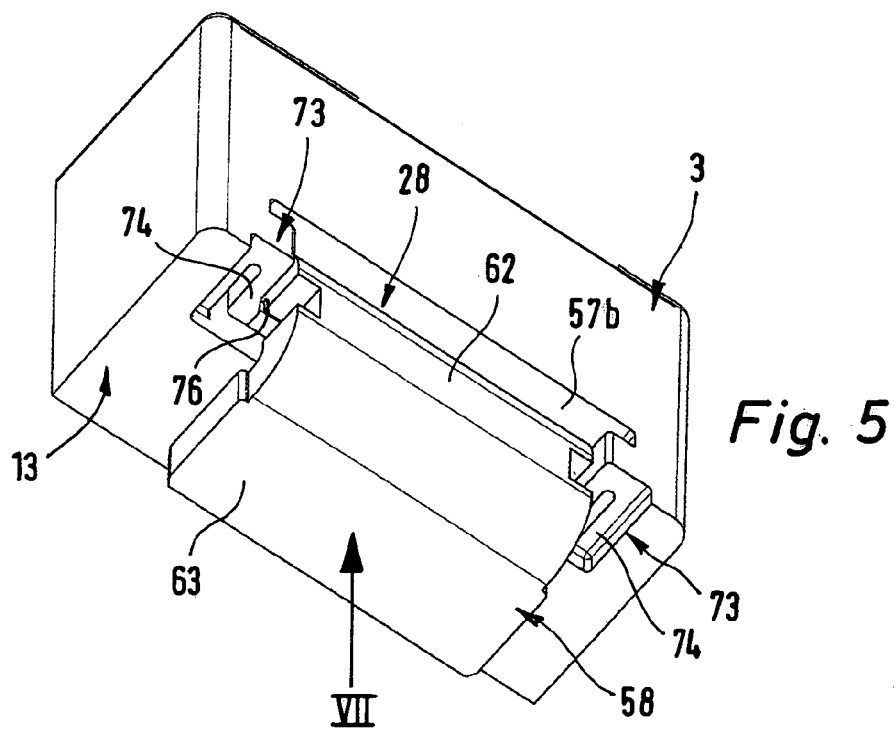
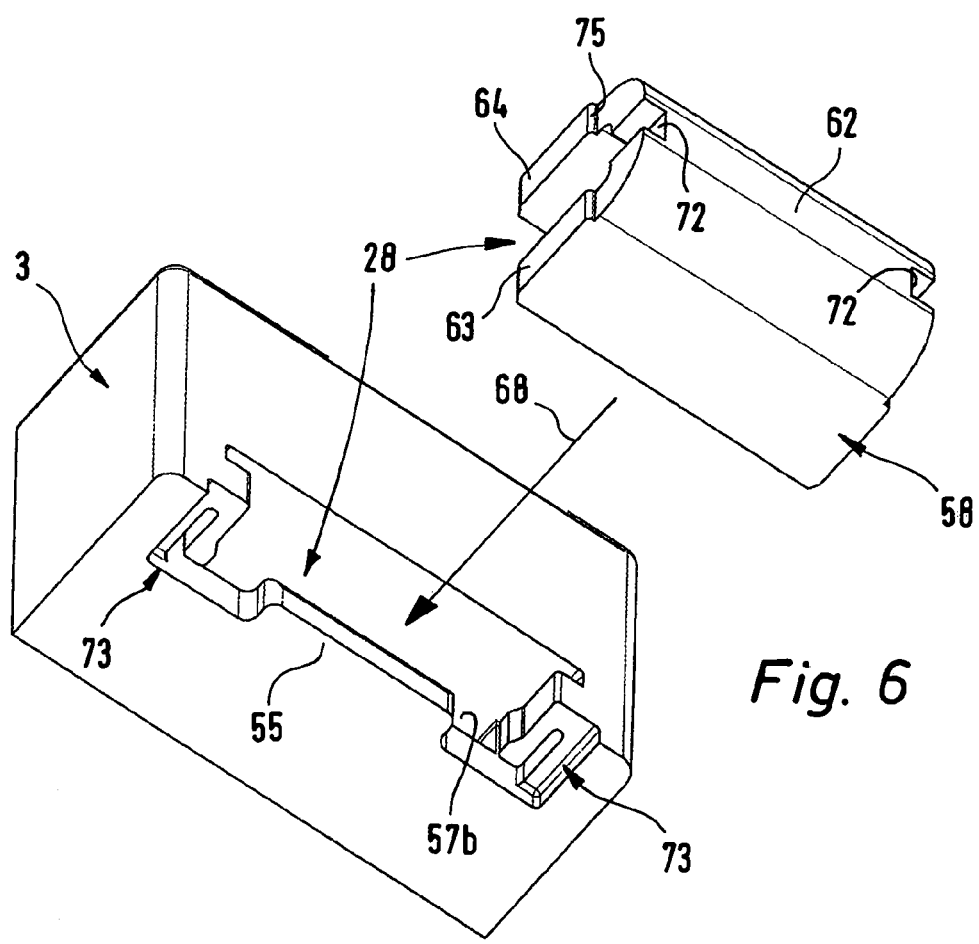

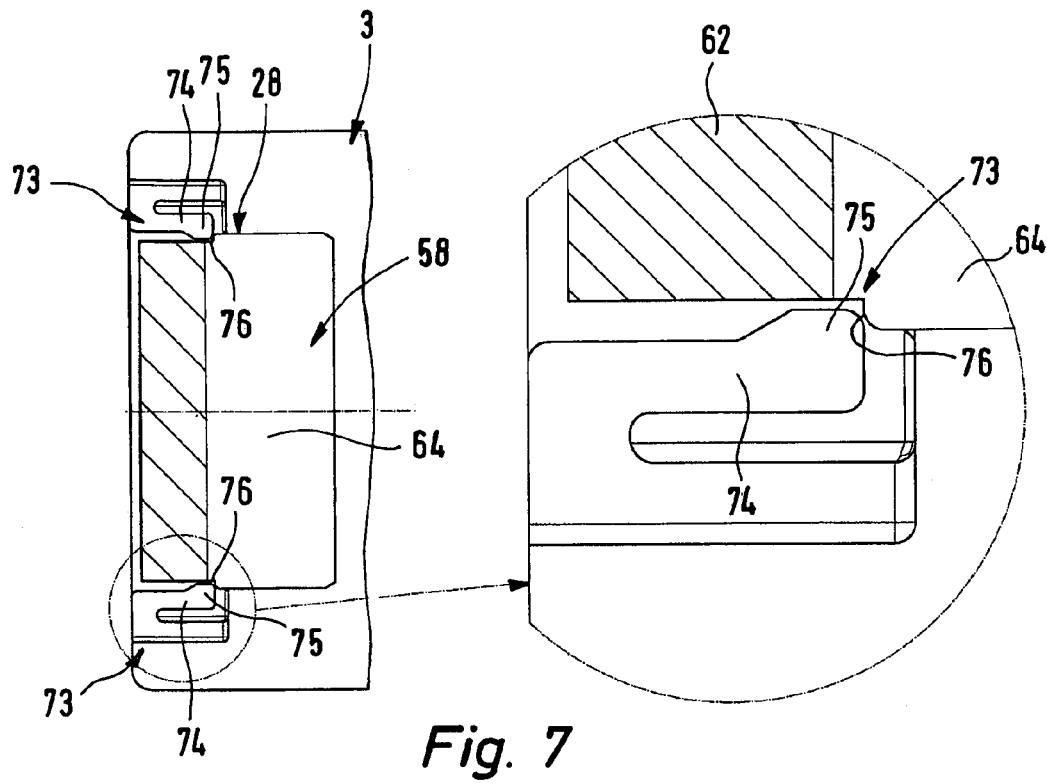
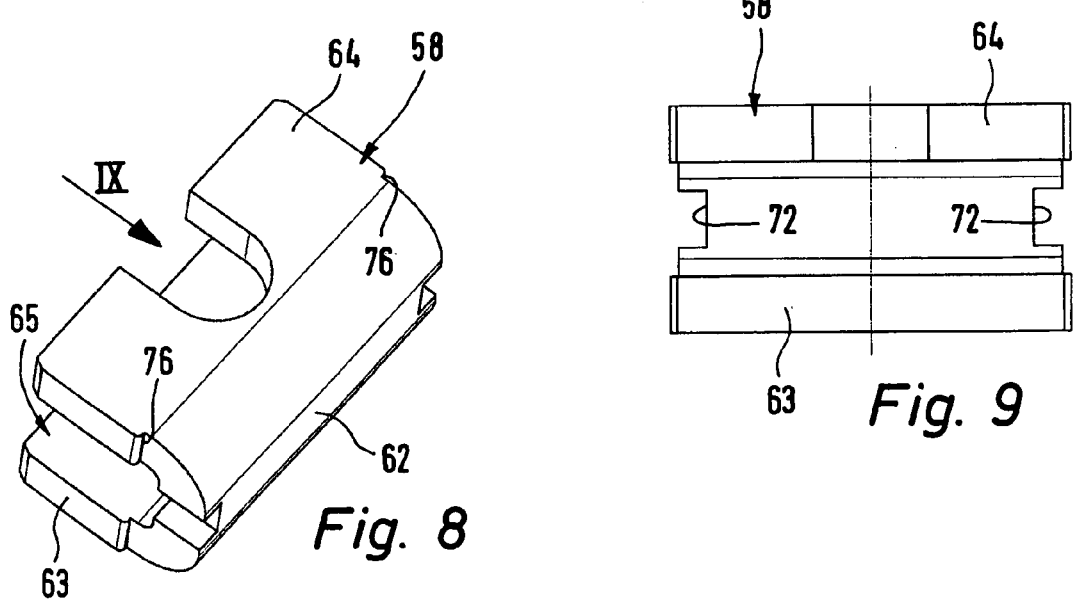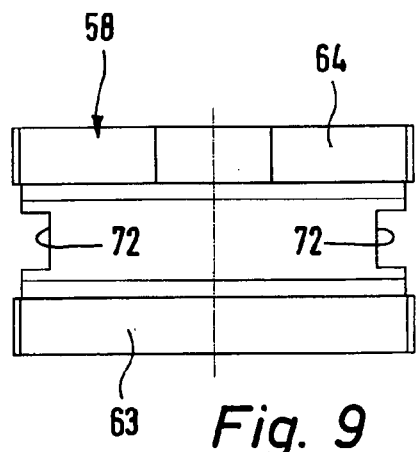
Fig. 7
Fig. 8
Fig. 9

STRUCTURE FOR MOUNTING VALVE UNITS ON A VALVE SUPPORT

This application claims priority based on an International Application filed under the Patent Cooperation Treaty, PCT/EP2007/010681, filed Dec. 7, 2007, and German Patent Application No. 102007002706.2, filed Jan. 18, 2007.

BACKGROUND OF THE INVENTION

The invention relates to a valve arrangement comprising a valve support having at least one component mounting face for a valve unit and at least one valve unit which with the formation of a structural unit is able to be mounted on the at least one component mounting face and to be fixed thereon by means of two spaced apart attachment means, the first attachment means having a hook section arranged on the valve support and a second stationary hook section provided for hooking onto it, on the valve unit, the second attachment means comprising at least one retaining clip for bracing the valve unit to the valve support.

A valve arrangement disclosed in the European patent publication EP 0493972 B1 of this type comprises a first attachment means with a first hook section mounted in a pivotal manner on the valve support and connected drivingly by a linkage with a retaining clip also mounted on the valve support, of a second attachment means. The retaining clip is an angled sheet metal component able to be clipped in place by means of an attachment screw acting on the linkage. For mounting in place a valve unit is firstly hooked in the retaining clip with the attachment screw slackened off then to form a valve unit cum valve support is swung onto the component mounting face of the valve support. This means that the first hook section is shifted into an-at-the-ready position opposite the second hook section arranged on the valve unit. By then tightening up the attachment screw on the one hand the retaining clip is clipped on and on the other hand at the same time, via the linkage, the first hook section is pivoted into a hooked engagement position with the second hook section and braced on it. Accordingly the valve unit is generally braced on the valve support in a releasable fashion.

The attachment means present in this prior art admittedly appear to function satisfactorily. In particular they render possible the plugging of the valve unit on the valve support by actuating measures limited to one side of the structural unit, namely the tightening of the attachment screw. The large number of components of the two attachment means and the measures for the mounting thereof on the valve support however involve relatively high manufacturing costs and particularly slow assembly of the individual components on the valve support.

The German patent publication DE 1211453 discloses a valve arrangement in which a valve unit is also able to be secured to a valve support by means of two spaced apart attachment means. The one attachment means comprises a toggle fastener able to brace the valve unit against the valve support. Prior to activation of the toggle fastener the valve unit is plugged in a direction parallel to the component mounting face and so connected with the valve support, it being joined with the valve support using the other attachment means. In the case of this valve arrangement the toggle fastener occupies a relatively large amount of space. Furthermore on plugging the valve unit to the valve support there may be damage to a seal between such two components, because the valve unit slides along the component mounting face. The latter disadvantage is admittedly to be avoided by clipping the valve unit at both terminal sides by means of a respective toggle fastener to the valve support. However this requires active actuating means on two sides of the assembly comprising the valve unit and the valve support, something which is relatively complex and is frequently hindered owing to a disadvantageous shortage of space on the site where the valve arrangement is employed.

The German patent publication DE 3447263 A1 discloses clipping individual segments of a valve unit by means of dovetail clips. The clips are thrust in from the side into the grooves in the adjacent valve support segments. Since a respective clip must be on opposite sides of the valve support segments, handling is relatively complex here as well.

SUMMARY OF THE INVENTION

One object of the present invention is to contrive a valve arrangement rendering possible a simple and secure attachment of at least one valve unit on a valve support.

In order to achieve this aim there is a provision such that the first hook section belonging to the first attachment means is arranged in a stationary fashion and independently of the retaining clip of the second attachment means on the valve support and that the retaining clip is designed with a U-like form with two mutually opposite clamping limbs, the retaining clip being able to be plugged to the structural unit, previously created by the mutual hooking together of the hook sections, in such a manner that its clamping limbs respectively span one clipping section of the valve unit and of the valve support with a loading bias and accordingly brace the valve unit against the component mounting face.

Accordingly the valve unit can be secured on the one hand by hooking and on the other hand by clipping with simple measures reliably on a valve support. For assembly firstly the hooked engagement takes place and then the retaining clip is clipped in place. The hooking action occurs separately from plugging on so that no interaction between the two attachment means is necessary and the structural complexity is reduced to a minimum. The fitting and attachment of the valve unit may take place from one side allowing easy handling where there is a shortage of space.

Further advantageous developments of the invention are defined in the dependent claims.

The hook sections are preferably so designed that hooked engagement entails a mutual latching of the valve unit and the valve support both at a right angle and also in parallelism to the component mounting face. To produce the hooked engagement the two components to be attached to each other are shifted into an oblique position in relation to one another and then pivoted until the valve unit comes to engage the component mounting face.

It is preferred for the first hook section to project past the component mounting face and to fit into a latching recess at the bottom side of the valve unit.

Preferably the first hook section is so arranged on the valve support that it is directed away from the second attachment means having the retaining clip. Hooking for attachment of the valve unit may take place from that side, toward which the first hook section is directed.

The swinging into position of the valve unit is facilitated if the first hook section is convexly curved at the top side facing the valve unit.

Owing to the abutment means it is possible to avoid the valve unit being accidentally displaced when mounted on the valve support during plugging in position of the retaining clip. The abutment means may in particular comprise at least one abutment projection (disposed on the valve unit) which} extends in front of an abutment face, facing in a direction opposite to the plugging of the retaining clip, of the valve support.

The clipping sections on the valve support and on the valve unit are more particularly so designed that plugging in position of the retaining clip is possible in a direction parallel to the component mounting face with the clipping opening orientated in the plugging direction.

The plugging or plugging on direction is more particularly in parallelism to a line running in a direction parallel to the component mounting face between the two attachment means.

The retaining clip can be held in position in the condition plugged to the structural unit by friction simply owing to its bias. An increased degree of security to avoid accidental release may be obtained if latching means are present, which ensure an interlocking but releasable attachment in position of the plugged retaining clip in relation to the valve unit and/or the valve support.

The latching means are particularly in the form of detent means, which snap in automatically on plugging on the retaining clip. The detent engagement is in this case preferably so designed that it may be overridden, when the retaining clip is engaged in the intended manner by a release tension force opposite to the plugging attachment direction, such force being more particularly applied by a release tool.

The valve unit is preferably provided with at least one electrically operated valve, which is in particular a solenoid valve or a piezoelectric valve.

Preferably at least one respective duct extends in the valve support, which opens at the component mounting face where it is in communication with a duct of the valve unit. At least one elastic seal placed in between the valve support and the valve unit ensures a leak-free fluid transfer. This seal is deformed and compressed by the bias of the retaining clip.

The components of the two attachment means may be arranged on the valve unit side, particularly on a base plate, which is fitted with at least one valve.

The valve support may possess several component mounting faces juxtaposed in a row, which are respectively able to be fitted or are fitted with a valve unit, the attachment taking place using the above mentioned attachment means.

Component mounting faces which are not required may be covered by a cover able to be installed instead of a valve unit, on which such components of the attachment means are provided, which correspond to those on the valve unit. Their attachment on a valve support may accordingly take place in the same manner as with the valve unit. Owing to covering over valve support ducts opening at the component mounting face are conveniently shut off.

The valve support can be formed by a distributing plate fitted, or able to be fitted, with one or more valve units. It is also just as possible to have a valve support in the form of the housing of a valve or fluid power device, for example the housing of a valve or of a fluid operated drive.

BRIEF DESCRIPTION OF THE DRAWINGS

In the following the invention will be described with reference to the accompanying drawings.

FIG. 5 depicts the portion V marked in FIG. 3 of the valve unit in a perspective view from below.

FIG. 6 represents the arrangement of FIG. 5 with the retaining clip not yet clipped in position.

FIG. 7 is a view from below of the portion illustrated in FIG. 5 looking in the direction of the arrow VII, the marked portion being shown on a larger scale in addition.

FIG. 8 is a perspective separate view of the retaining clip.

FIG. 9 is a front view of the retaining clip of FIG. 8 looking in the direction of the arrow IX toward the clip opening.

DETAILED DESCRIPTION OF THE PREFERRED EMBODIMENTS

Figure 1:
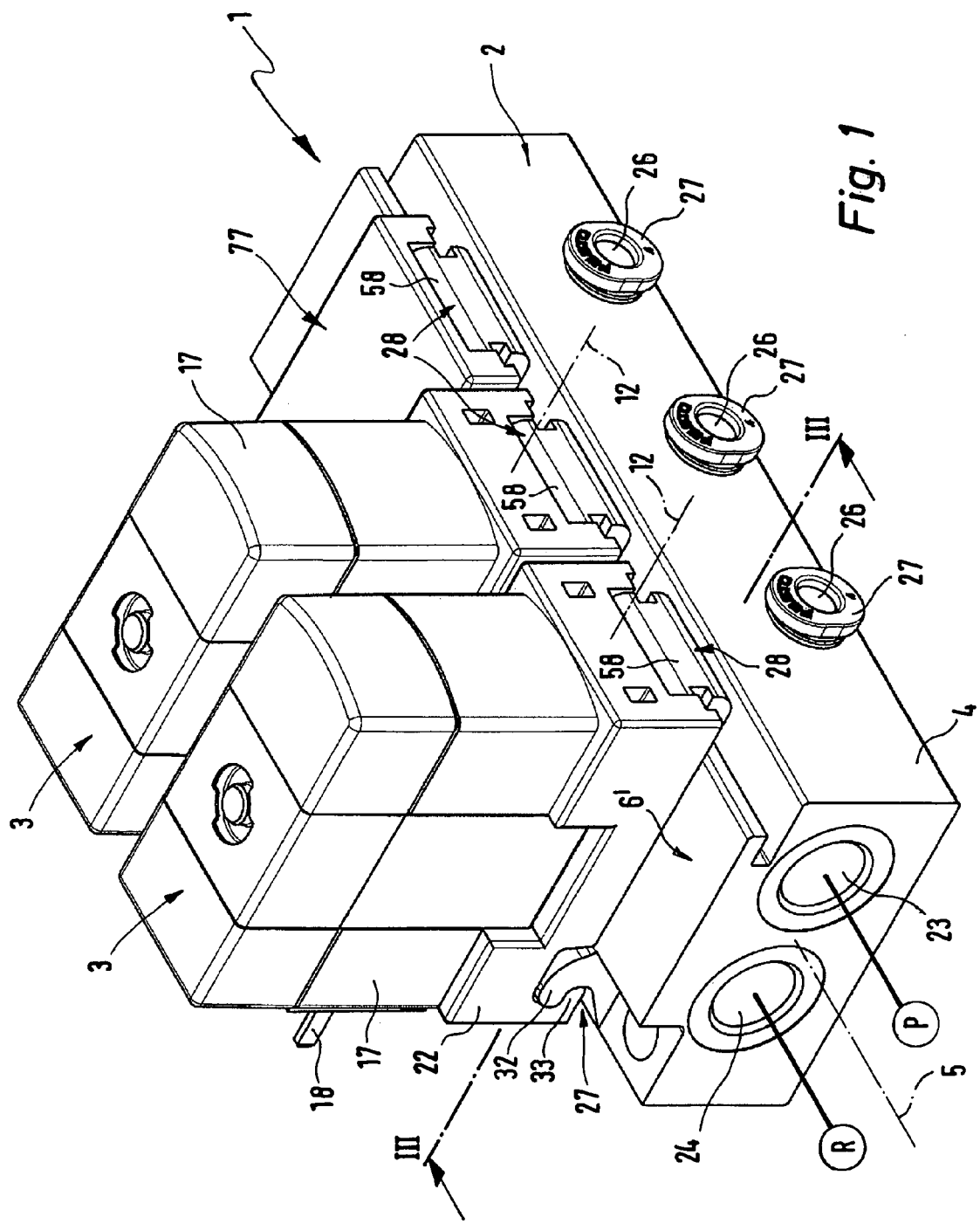
FIG. 1 shows a preferred first direction of the valve arrangement of the invention in a perspective elevation.

The valve arrangement generally referenced 1 comprises a valve support 2 and at least one valve unit 3 mounted or able to be mounted thereon in a preferably detachable manner. In the case of the working example of FIG. 10 fitting with only one valve unit 3 is provided for. The working embodiment of FIGS. 1 through 9 renders possible simultaneous fitting with more than valve unit 3 and in this example fitting with in all three valve units 3 is possible.

The valve support 2 comprises a valve support body 4 preferably having an elongated configuration its axis being marked 5. On the outer face of the valve support body 4 there is a number of component mounting faces 6 equal to the number of simultaneously mounted valve units 3 and on such faces respectively a valve unit 3 is able to be disposed with the formation a valve unit-valve support structural unit only termed a "structural unit" for the sake of simplification.

In the case of the multiple arrangement on component mounting faces 6 in accordance with FIGS. 1 through 9 there is more particularly a provision such that the said component mounting faces are juxtaposed in sequence in the direction of the valve support's longitudinal axis 5 on one and the same outer face of the valve support body 4. The valve support body 4 is provided with a preferably flat component mounting face 6' which is divided up into the desired number of component mounting faces 6.

The principal axis 8 of each component mounting face 6 is in the example the longitudinal axis of the component mounting face 6. Preferably the component mounting faces are so aligned that their principal axes 8 extend at a right angle to the longitudinal axis 5 of the valve support.

The principal axes 12 of the valve units 3 preferably coincide with the longitudinal axis of the respective valve unit 3. In the assembled condition of the valve arrangement 1 the principal axes 8 and 12 extend in parallelism to each other.

Each valve unit 3 is able to be so disposed on the valve support body 4 that a floor face 13, provided on the bottom side thereof, assumes a position on the associated component mounting face 6. The component mounting face 6 and the floor face 13 are more particularly plane.

At each component mounting face 6 there opens at least one valve support duct 14 extending in the valve support 2. In the example three valve support ducts 14 open at each component mounting face 6, in which respect however in the representations of the FIGS. 3, 4 and 10 only one such valve support duct 14 is visible. The duct openings at the component mounting face 6 are referenced 14a.

In each valve unit 3 there extends at least one valve duct 15, which opens via a duct opening 15a at the floor face 13. In the example the number of the valve ducts 15 opening at the floor face 13 is equal to the number of valve support ducts 14 opening at the associated component mounting face 6. The arrangement is so contrived that when the valve unit 3 is installed on the component mounting face 6 the valve ducts 15 and the valve support ducts 14 are joined together at the floor face 13 and the component mounting face 6 in pairs. In order to render leak-free fluid transfer possible the mutually communicating pairs of duct openings 14*a* and 15*a* are surrounded by a respective elastic gasket 16, which is placed between the component mounting face 6 and the floor face 13.

Each valve unit 3 comprises at least one electrically operated valve 17 suitable for the control of fluid flows. In FIG. 1 one of the connection contacts 18 is visible via which the valves 17 receive their electrical control signals. Preferably each valve unit 3 possesses a base plate 22 defining the floor face 13, on which the at least one associated valve 17 is mounted in a detachable manner. Other designs of the valve units 3 are however also possible.

In the example the valve 17 is a solenoid valve. However the invention also contemplates a piezoelectric valve. The valves may be directly controlled or also pilot valves.

In a manner dependent on the operating state of a valve unit 3 the valve ducts 15 associated with it and accordingly the valve support ducts 14 communicating therewith are joined together in a differing scheme.

In the case of the working example of FIGS. 1 through 9 the valve support 2 is designed in the form of a distribution or manifold plate for distribution of the fluid. It has extending through it at least one supply duct 23 able to be connected with a pressure source P and at least one venting duct 24 able to be connected with a pressure sink R parallel to the valve support's longitudinal axis 5, each of such two ducts 23 and 24 opening to each component mounting face 6. Moreover, at least one individual valve support duct 14 (designed as a working duct 25) runs out from each component mounting face 6, such duct 14 opening via a port 26 at an outer face of the valve support duct 14, where owing to associated connection means 27, there is a possibility of detachably connecting a fluid duct leading to a driven load. The valve arrangement 3 therefore here generally represents a valve cluster.

Figure 10:
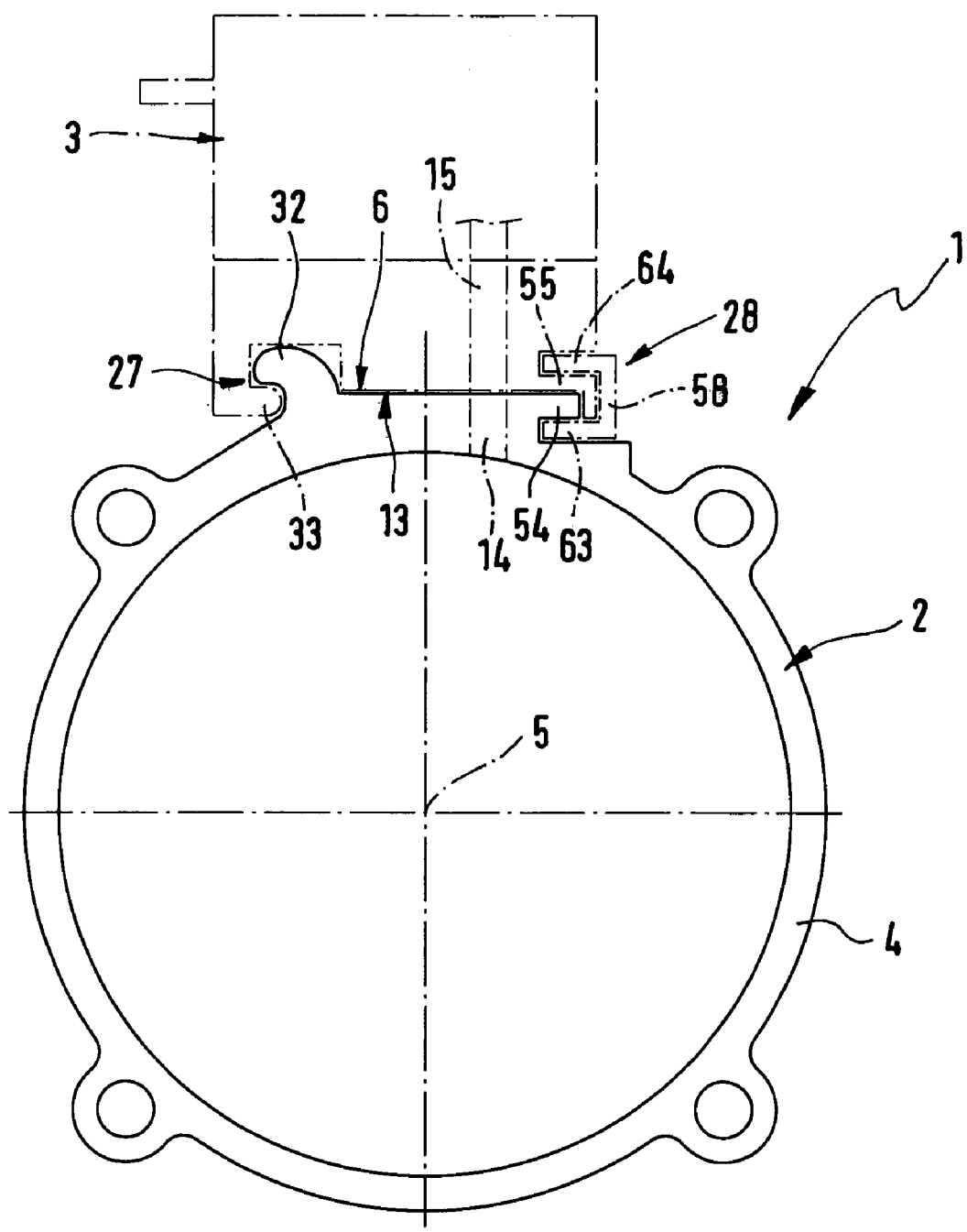
FIG. 10 is a partly diagrammatic representation of a further embodiment of the valve arrangement.

In the working embodiment illustrated in FIG. 10 the valve support 2 is constituted by the housing of fluid power device, as for example by the housing of a valve or a fluid operated drive. If it is a question of a valve housing, the at least one valve unit 3 will more especially function as a pilot valve. In the case of a design in the form of a fluid operated drive the operating state of the fluid operated drive will be set via the at least one valve unit 3.

All the designs of the valve support share the same manner of attachment of a valve unit 3 thereon. This will be explained in detail in the following more particularly with reference to FIGS. 1 through 9.

Each valve unit 3 is able to be fixed in position by means of two first and second attachment means 27 and 28, spaced apart in the direction of the principal axes 8 and 12 from each other, in a preferably detachable fashion on a component mounting face 6 with a sealing effect for the fluid transfer between the valve support ducts 14 and the valve ducts 15.

The first attachment means is provided with a first hook section 32, arranged in a stationary manner on the valve support 2. Such hook section delimits the component mounting face 6 at its two terminal sides extending in the direction of the principal axis 8, it preferably projecting beyond the component mounting face 6 toward the valve unit 3. The first hook section 32 preferably has its free end 34 directed away from the second attachment means 28.

Preferably the first hook section 32 is curved in an arcuate manner. It more especially possesses a convexly fashioned surface 35 facing the valve unit 3.

On the side, opposite to the component mounting face 6, of the first hook section 32 the valve support body 4 is preferably provided with a recess 36 extending more deeply than the component mounting face 6, preferably at a base face 36*a* slanting obliquely away from the component mounting face 6.

The first hook section 32 cooperates with a second hook section 33, having a matching configuration, of the first attachment means 27 which is arranged stationarily on the valve unit 3.

The second hook section 33 adjoins the floor face 13 in the direction of the principal axis with a clearance, its free end 37 being directed toward the second attachment means 28, i.e. oppositely to the free end 34 of the first hook section 32.

Between the second hook section 33 and the floor face 13 there is a downwardly open latching recess 38, formed in the valve unit 3, into which the first hook section 32 can fit in order to make hooked engagement with the second hook section 33. Just like the floor face 13 and the second hook section 33 accordingly the latching recess 38 as well is located on the bottom side, facing the valve support 2, of the valve unit 3.

The width of the opening 42 as measured along the principal axis 12 is less than the width dimensions, measured in the same direction, of the first hook section 32. Therefore the valve unit 3 can not be mounted on the component mounting face 6 at a right angle to it in a straight line. The production of the hooked engagement is instead in the manner indicated in FIG. 4, in which the valve unit 3, with the principal axis 12 slanted in relation to the principal axis 8 is mounted from the side, opposite to the second attachment means, on the valve support 2, the first hook section 32 being threaded in through the opening 42 into the latching recess 32, which then widens. The recess 36 renders possible the necessary oblique positioning of the second hook section 33.

When the two hook sections 32 and 33 are hooked in aslant between the valve unit 3 and the valve support 2, the valve unit 3 may be pivoted toward the valve support 2 as indicated by the arrow 43 until its floor face 13 virtually engages the mounting face 6. The virtual pivot axis 44 for the pivotal movement 43 extends in parallelism to the component mounting face 6 and at the same time at a right angle to the principal axis 8 and is located in the engagement zone of the two hook sections 32 and 33.

The two hook sections 32 and 33 are fixedly arranged on the valve unit 3 and, respectively, the valve support 2, it being more particularly a question of integral parts of these components. In the actual example the first hook section 32 is molded integrally on the valve support body 4 and the second hook section 33 is molded integrally on the base plate 22 or some other housing part of the valve unit 3.

Owing to the pivoting of the valve unit 3 toward the component mounting face 6 as indicated by the arrow 43 there is not only a hooking around of the hook sections 32 and 33 but there is furthermore a movement of the first hook section 32 into the latching recess 38. When it has fitted into it in this manner, there is a certain latching of the structural unit (made up of the valve unit 3 and the valve support 2) in the direction of the principal axes 8 and 12. It is only by a pivoting back of the valve unit 3 opposite to the direction 43 of pivoting that it can be removed from the valve support 2 again.

As an alternative or additional measure for securing the relative position between the valve support 2 and the valve unit 3 disposed on it in the direction of the principal axes 8 and 12 an abutment means 45 may be present. It more especially avoids a displacement of the valve unit in relation to the valve support 2 in a direction toward the second attachment means 27.

In the actual example the abutment means 45 comprises a downwardly directed abutment projection 46 disposed adjacent to the second attachment means 28 and arranged on the valve unit 3, such projection 46 extending past the floor face 13. When the valve unit 3 engages the component mounting face 6 the abutment projection 46 projects in front of an abutment face 47, facing away from the first attachment means 27, of the valve support body 4 so that the valve unit 3 is arrested. Owing to the abutment means 45 on the one hand and the first attachment means 27 on the other hand there is therefore an interlocking retention in position between the valve support 2 and the valve unit 3 mounted thereon in the along of the principal axis 8 and 12 in either direction.

It can be convenient to provide for a locking of the components 3 and 2, which fit together, also at a right angle to the principal axes 8 and 12, i.e. in the present case in the direction of the longitudinal axis 5 of the valve support. This ensures an automatic systematic association of the valve support ducts 14 to be connected together and the valve ducts 15 on mounting the valve unit 3. Retention in position is more particularly effected by an interlocking engagement between the valve support 2 and the valve unit 3.

In the working example suitable position retention means 48 are provided including a positioning recess 52 in the component mounting face 6, into which a positioning projection 53 (projecting from the floor face 13 of the valve unit 3) fits in an interlocking manner during the pivotal movement 43. If required several pairs of such positioning recesses 52 and positioning projections 53 could be present. There is also the possibility of having the positioning recess 52 on the valve unit 3 and the positioning projection 53 on the valve support 2.

Owing to the second attachment means 28 the structural unit 7 can be secured in its mounted relative position.

The second attachment means 28 includes a first clipping section 54 and a second clipping section 55 disposed on the valve unit 3, such sections being opposite to each other in a height direction 56 (perpendicular to the component mounting face 6) when the valve unit 3 is pivoted toward the valve support 2. The two clipping sections 54 and 55 may in this respect in particular directly engage one another.

The clipping sections 54 and 55 are located at the edge of the component mounting face 6 and, respectively, of the floor face 13, it being possible for them to have a section thereof. They extend in the direction of the principal axes 8 and 12 away from the first attachment means 27, there being at sides directed away from each other in the height direction 56 a respective free space 57a and 57b, which more particularly may be formed by a recess open toward the front side (opposite to the attachment means 27) in the valve support 2 or, respectively, in the valve unit 3.

The above mentioned abutment means 45 is preferably formed at the two clipping sections 54 and 55.

As a further component the second attachment means 28 has a U-shaped retaining clip 58, which is illustrated separately in FIGS. 8 and 9 again.

The retaining clip 58 comprises two clamping limbs 63 and 64 extending from a rib section 62 (which connects them) in the same direction, with a clip opening 65 delimited by the clamping limbs 63 and 64 at the front side arranged opposite to the rib section 62. The retaining clip 58 is a self-contained component, which is only attached to the valve unit 7 after the hooking operation is completed and the floor face 13 has been pivoted toward the component mounting face 6. The clearance distance between the two clamping limbs 63 and 64 is, in the not yet mounted state of the retaining clip 58, somewhat less than the distance apart, existing in the installed state of the valve unit 3, between the working faces 66 and 67 facing the adjacent free space 57a and 57b, of the two clip sections 54 and 55.

For assembly the retaining clip 58 is so shifted with its opening 65 to the fore, in a clip-on direction 68 toward the structural unit 7 that one respective clamping limb 63 and 64 fits over one of the two clip sections 54 and 55 on the side facing the free space 57a and 57b. During this process there is a slight resilient widening of the retaining clip 58 with the consequence that the clamping limbs 63 arm 64 engage the working faces 66 and 67 and accordingly brace the valve unit 3 firmly in the direction of the vertical axis 56 onto the valve support 2.

During this bracing operation at the same time the at least one elastic seal 16 is thrust between the component mounting face 6 and the floor face 13 with the result that a highly effective sealing action is produced.

As will be seen there is a mutually independent maneuvering of the two attachment means 27 and 28. Both handling operations can be carried out without any difficulty from the front side, having the second attachment means 28, of the valve arrangement 1 with the result that each valve unit 3 can be relatively simply installed even where there is little space.

Figure 4:
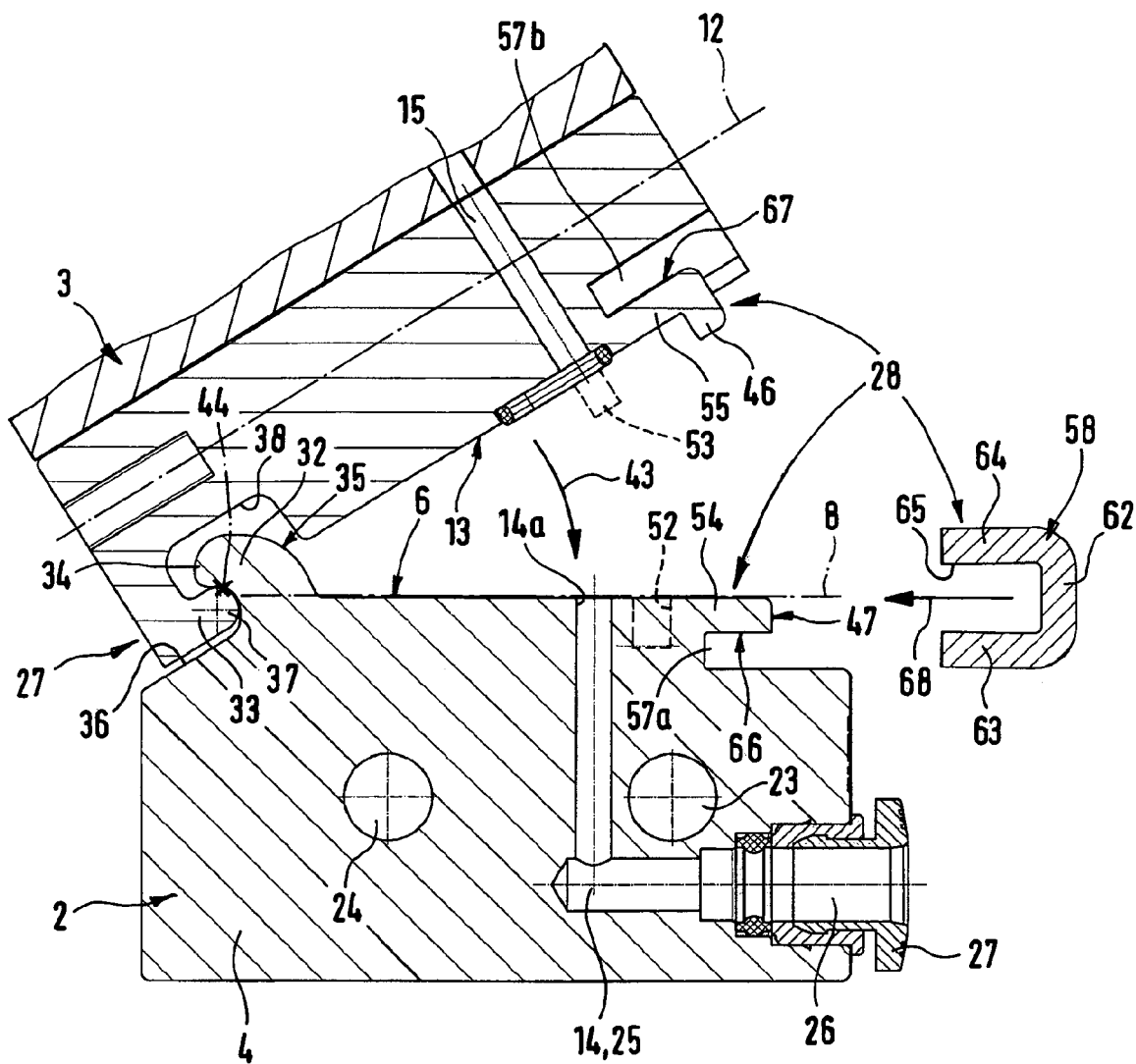
FIG. 4 shows a condition of the valve arrangement during the assembly of a valve unit in a sectional similar to that of FIG. 3.

The two hook sections 32 and 33 are matched to each other that they reliably hold the valve unit 3 (when pivoted toward the component mounting face 6) in the height direction 56. Accordingly it will be sufficient for the clipping force to be applied at a distance from the hook engagement and only at the second attachment means 28. For any necessary compensation of tolerance the at least one seal may be employed which is so designed that the thrust force necessary for reliable sealing is provided before the floor face 13 engages the component mounting face 6. More particularly a design is preferred in which the at least one elastically deformable seal 16 is thrust into and interlocked with a pit in the floor face 13, or also the component mounting face 6, past which same extends in the stress-free state, as is illustrated in FIG. 4.

The clip-on direction 68 of the retaining clip 58 preferably extends parallel to the component mounting face 6 and more particularly in the direction of the principal axes 8 and 12. During plugging on, i.e. clipping on, the clamping limbs 63 and 64 accordingly fit into the free spaces 57a and 57b with their terminal face, opposite to the rib section 62, to the fore.

Owing to the bias produced the retaining clip 58 is for its part held by a force fit on the structural unit 7 and can not be taken off accidentally. Nevertheless taking it off prior to the removal of valve unit 3 is readily possible by drawing off the retaining clip 58 using a suitable pulling tool again, which is not illustrated. For this purpose it is possible to provide specially adapted tool engagement sections 72. As a drawing tool a plier would for example come into question. Using the plier tool a releasing tension force may be applied to the retaining clip 58 to override the clip force.

If the valve arrangement is subjected to heavy vibrations during operation, it is preferred to adopt additional position holding measures for the clipped on retaining clip 58. Such measures may more especially have the form of suitable latching means 73 as are illustrated by way of example in FIGS. 5 through 9. The latching means 73 allow an interlocking latching of the clipped on retaining clip 58 and also permit renewed withdrawal from the structural unit 7 if required.

In order to fulfill the above mentioned conditions a design of the latching means 73 is best taking the form of detent means, which on plugging on the retaining clip 58 automatically perform their detent function.

In the example two resilient detent hooks 74 are arranged on the valve unit 3. They flank the associated free space 57*b* on opposite longitudinal sides and possess detent projections 75 extending into the free space 57*b* laterally. During temporary splaying out of the free space 57*b* they can be bent outward when a certain force is applied.

On the clamping limb 64 fitting into the associated free space 57*a* The retaining clip 58 comprises externally on the longitudinal side a respective latching step 76, which more particularly results from the fact that the associated clamping limb 64 is broader toward its free end than toward the rib section 62.

When the retaining clip 58 has reached the desired depth of insertion on plugging in position, the detent projections 75 of the detent hooks 74 fit in behind the latching steps 76 and consequently latch the clipped on retaining clip 58. It is only when with the use of a suitable tool that a sufficiently powerful release force is exerted on the retaining clip 58 that the latching force may be overcome and the detent hooks 74 will temporarily be pivoted outward with the release of the latching engagement.

In the actual example the detent hooks 74 are arranged on the valve unit 3. They could however as an alternative or in addition also be formed on the valve support 2.

It is preferred for the detent hooks 74 to be integral with the base plate 22 or some other housing part of the valve unit 3.

The latching means 73 could be designed with only one detent hook 74 instead of with several hooks 74. Furthermore the detent means could operate with different detent locking principles.

If a component mounting face present is not to mount a valve unit 3 while permitting operation of the valve arrangement 1, as an alternative a cover 77 as illustrated in FIG. 1 can be installed on each component mounting face. The cover can for example be a plain cap. It is attached in the same manner as a valve unit 3, for which reason it possesses the same components of the first and second attachment means 27 and 28 as a valve unit 3. On the bottom side of the cover 77 facing the component mounting face 6 there is in particular also at least one elastic seal, by which the duct openings 14*a* are shut off in a fluid-tight fashion, when the cover 77 is installed.

Figure 2:
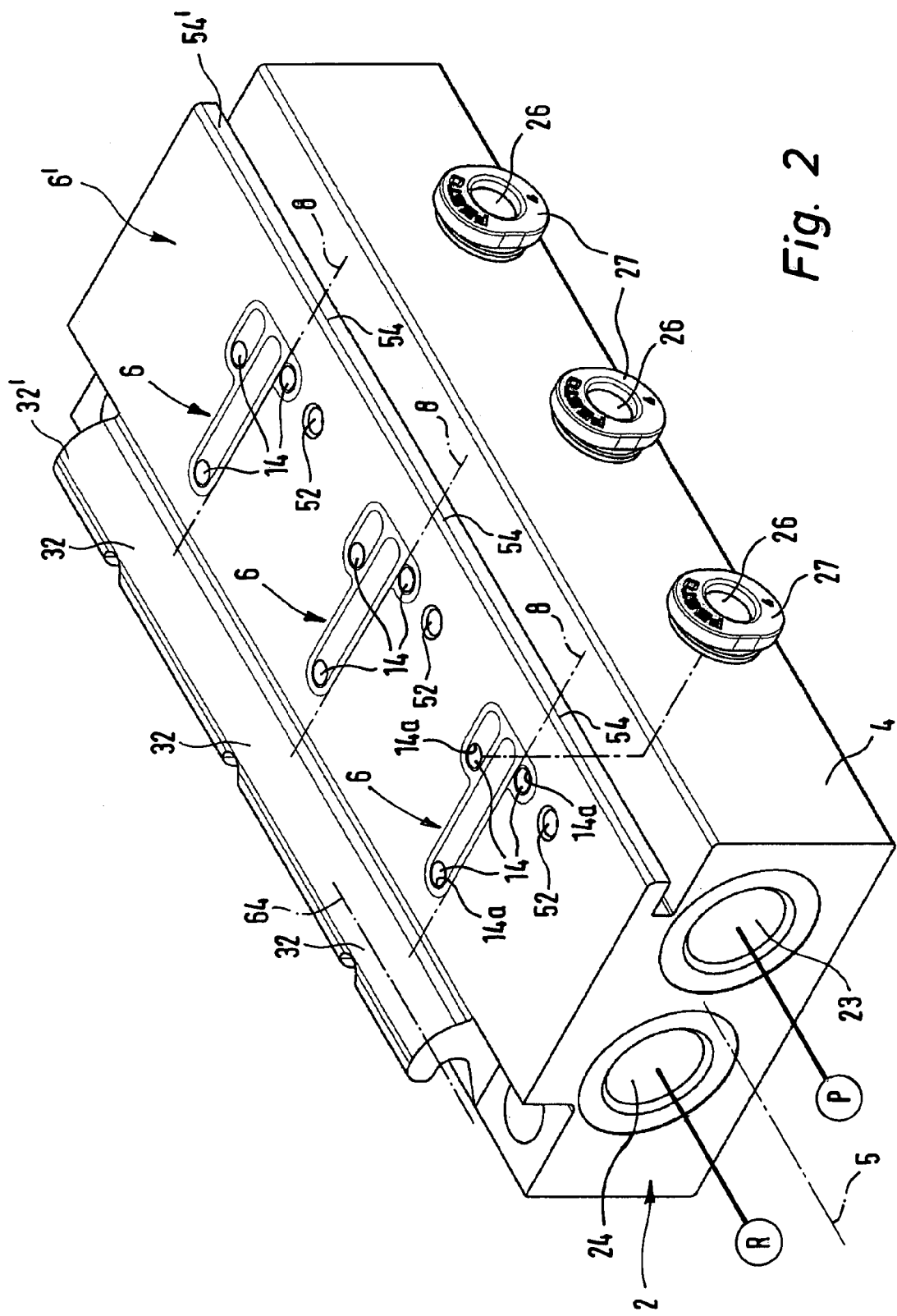
FIG. 2 is a separate view of the valve support present in the valve arrangement in accordance with FIG. 1.
Figure 3:
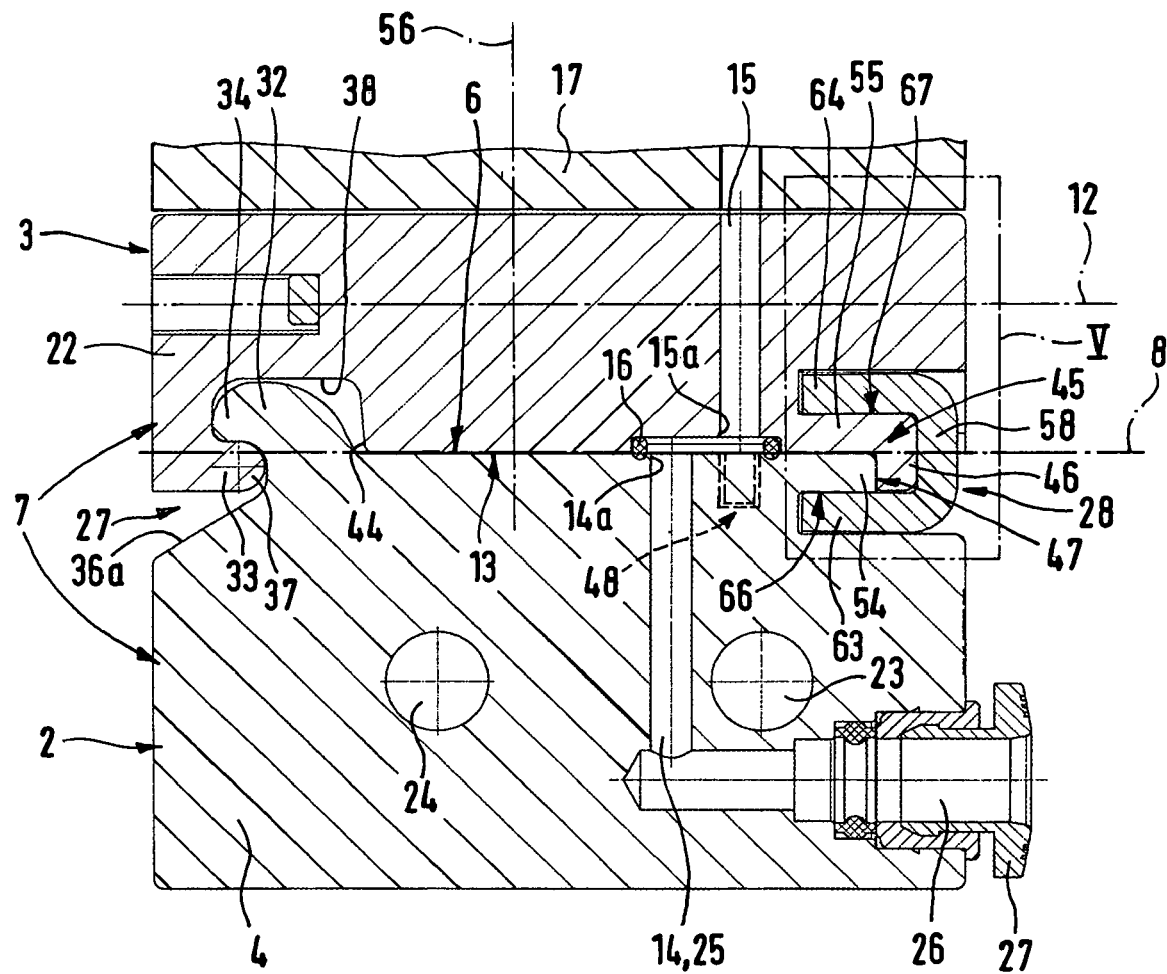
FIG. 3 shows a cross section taken through the arrangement of FIG. 1 on the section line III-III.

If the valve support 2 bears several juxtaposed component mounting faces 6, as is illustrated in FIG. 2 for example, the individual first hook sections 32 may be joined together as a continuous hook bar 32'. In this case the first clip sections 54 arranged on the valve support 2 can be a component of a coherent clip bar 54'.

The invention claimed is:

1. A valve arrangement comprising a valve support having at least one component mounting face for a valve unit and at least one valve unit which with the formation of a structural unit is able to be mounted on the at least one component mounting face and to be fixed thereon by two spaced apart attachment means comprising a first attachment means and a second attachment means, the first attachment means having a first hook section arranged on the valve support and a second stationary hook section provided on the valve unit for hooking onto the first hook section, the second attachment means comprising at least one retaining clip for bracing the valve unit to the valve support, wherein the first hook section is arranged in a stationary fashion and independently of the retaining clip on the valve support, and wherein the retaining clip is designed in a U-like form with two mutually opposite clamping limbs, the retaining clip being able to be plugged to the structural unit upon the mutual hooking together of the hook sections, in such a manner that its clamping limbs respectively span one clipping section of the valve unit and of the valve support with a loading bias and accordingly also brace the valve unit against the component mounting face.

2. The valve arrangement in accordance with claim 1, wherein the two hook sections of the first attachment means are hooked into engagement by obliquely attaching and then mutually pivoting the valve unit and the valve support.

3. The valve arrangement in accordance with claim 1, wherein the hooked engagement of the hook section entails a mutual latching of the valve unit and the valve support both at a right angle to the component mounting face and also parallel to the component mounting face.

4. The valve arrangement in accordance with claim 3, wherein, in hooked engagement, at least one of the hook sections fits into a latching recess in the other component of the structural unit.

5. The valve arrangement in accordance with claim 4, wherein the latching recess is arranged on a bottom side, facing the valve support, of the valve unit.

6. The valve arrangement in accordance with claim 1, wherein the first hook section protrudes past the component mounting face.

7. The valve arrangement in accordance with claim 1, wherein the first hook section disposed on the valve support is directed away from the second attachment means.

8. The valve arrangement in accordance with claim 7, wherein the first hook section is shaped in a convexly curved manner on a top side facing the valve unit in order to render it possible for the valve unit to pivot past thereof during the hooking operation.

9. The valve arrangement in accordance with claim 1, further comprising an abutment means which, with the structural unit fitted together, prevents shifting of the valve unit in relation to the valve support in the plugging on direction of the retaining clip.

10. The valve arrangement in accordance with claim 9, wherein the abutment means on the valve unit has at least one abutment projection extending in front of an abutment face of the valve support which is facing oppositely to the plugging on direction of the retaining clip.

11. The valve arrangement in accordance with claim 1, wherein the retaining clip is able to be plugged on the structural unit in a direction of plugging on which is parallel to the component mounting face with the clip opening directed in the plugging on direction.

12. The valve arrangement in accordance with claim 11, wherein the plugging on direction extends in parallelism to a line which is parallel to the component mounting face and extends between the two attachment means.

13. The valve arrangement in accordance with claim 1, wherein the clipping section of the valve unit and the clipping section of the valve support extend away from the first attachment means.

14. The valve arrangement in accordance with claim 1, wherein latching means are present by which the retaining clip, in the state plugged onto the structural unit, is held interlockingly in position releasably.

15. The valve arrangement in accordance with claim 14, wherein the latching means are arranged on the one hand on the retaining clip and on the other hand on the valve unit.

16. The valve arrangement in accordance with claim 14, wherein the latching means comprises detent means which automatically lock into position on plugging on the retaining clip.

17. The valve arrangement in accordance with claim 16, wherein the latching means comprise at least one resiliently elastic detent hook arranged on the structural unit, said hook engaging a latching step on the retaining clip when the retaining clip is clipped in position and which during application of a release force opposite to the plugging on direction is able to be shifted, owing to the cooperation with the latching step, into an unlatching position permitting the pulling off of the retaining clip.

18. The valve arrangement in accordance with claim 17, wherein detent hooks are present which are associated with two opposite longitudinal sides of the retaining clip.

19. The valve arrangement in accordance with claim 17, wherein the at least one detent hook is disposed on the valve unit.

20. The valve arrangement in accordance with claim 1, wherein the retaining clip has at least one tool engagement section arranged thereon, said tool engagement section permitting engagement of a pulling tool rendering possible drawing off the retaining clip from the structural unit.

21. The valve arrangement in accordance with claim 1, wherein the valve unit comprises at least one electromagnetic valve.

22. The valve arrangement in accordance with claim 1, wherein the valve support contains at least one valve support duct opening at the component mounting face, said valve support duct, with the valve unit mounted in position, communicates with at least one valve duct extending in the valve unit and opening at the oppositely arranged bottom side of the valve unit.

23. The valve arrangement in accordance with claim 22, wherein, between the valve unit and the valve support, at least one elastic seal is placed for sealing the duct connection between at least one valve support duct and at least one valve duct, said seal being braced between the valve unit and the valve support when the retaining clip is clipped in place.

24. The valve arrangement in accordance with claim 1, wherein the components associated with the valve unit of the two attachment means are disposed on a base plate being equipped with at least one valve of the valve unit.

25. The valve arrangement in accordance with claim 1, further comprising position securing means, interlocking with one another, on the valve support and on the valve unit for securing the position of components athwart a line running between the two attachment means.

26. The valve arrangement in accordance with claim 1, wherein, on the valve support, several component mounting faces are arranged in a row adjacent to one another, each component mounting face being fitted or able to be fitted with a valve unit.

27. The valve arrangement in accordance with claim 1, further comprising at least one cover able to be installed on a component mounting face in lieu of a valve unit, said cover being provided with components of the attachment means, which correspond to those of a valve unit.

28. The valve arrangement in accordance with claim 1, wherein the valve support comprises a distribution plate fitted or able to be fitted with a plurality of valve units.

29. The valve arrangement in accordance with claim 1, wherein the valve support is constituted by the housing of a fluid power device.

30. The valve arrangement in accordance with claim 1, wherein the retaining clip consists of resiliently elastic material.

* * * * *